Inventor:
Leopold Oxhandler
By Wm. F. Freudenreich
Atty.

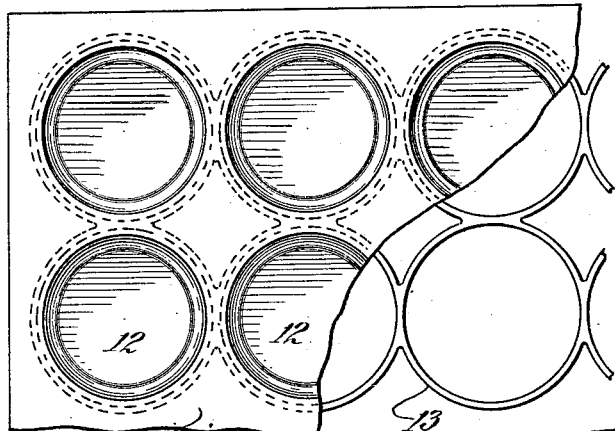
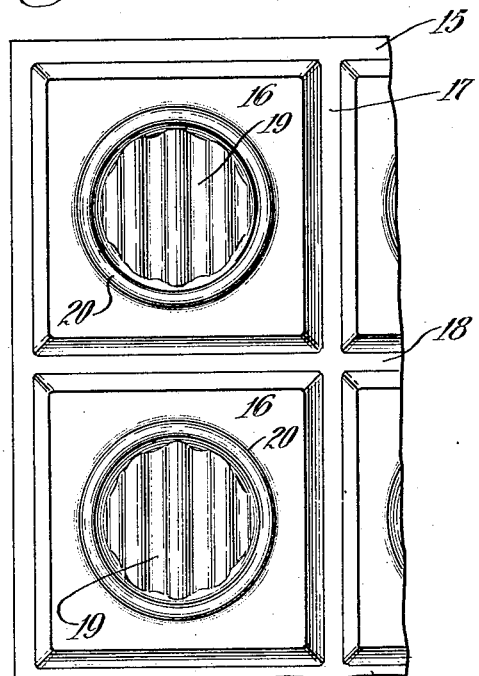
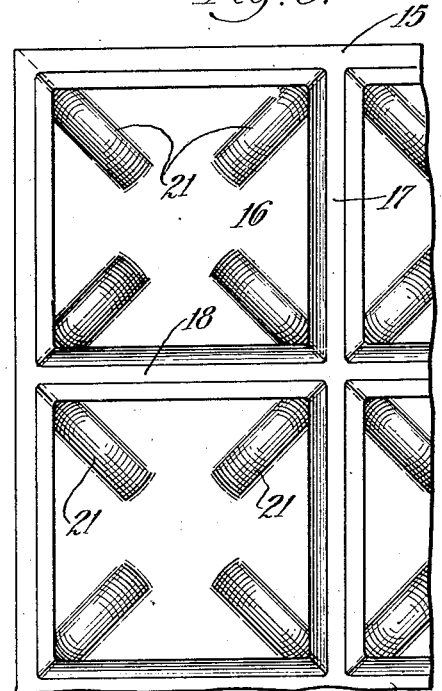
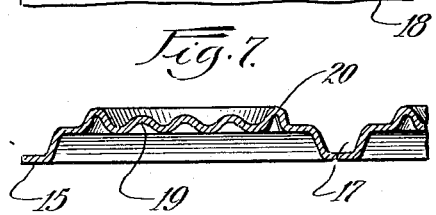

April 28, 1931.  L. OXHANDLER  1,803,128
FLAT AND CUSHION FOR CELLULAR FILLERS
Filed Feb. 9, 1927   3 Sheets-Sheet 3
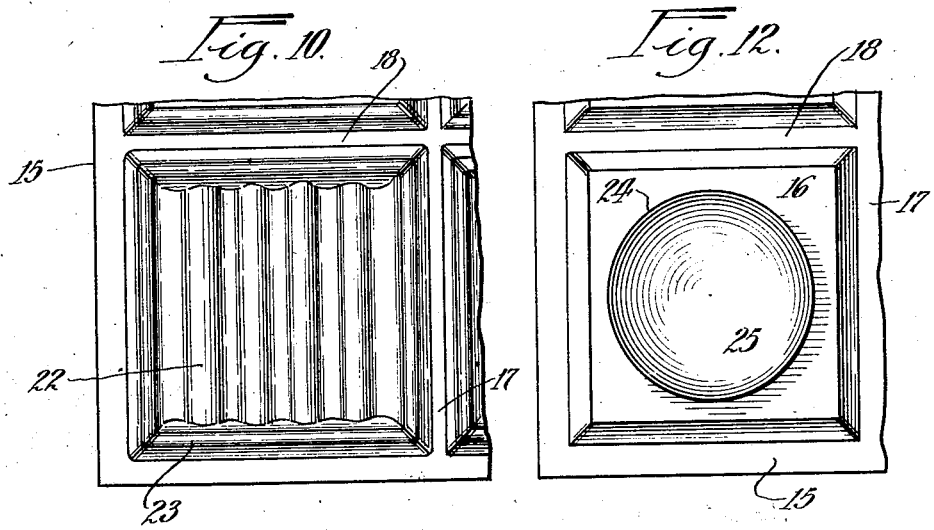
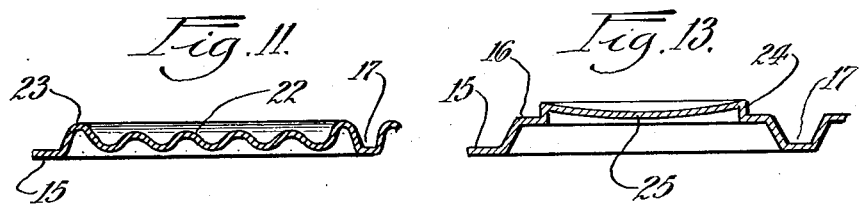
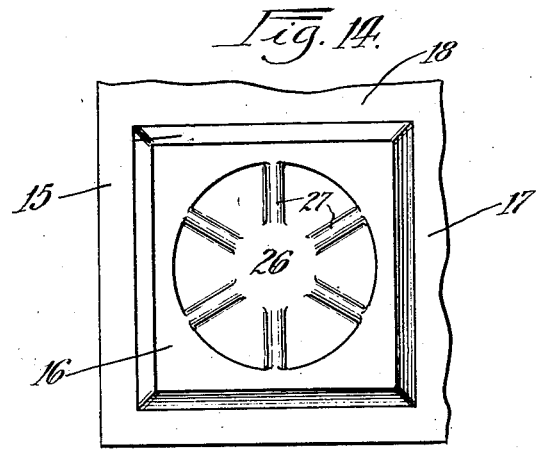
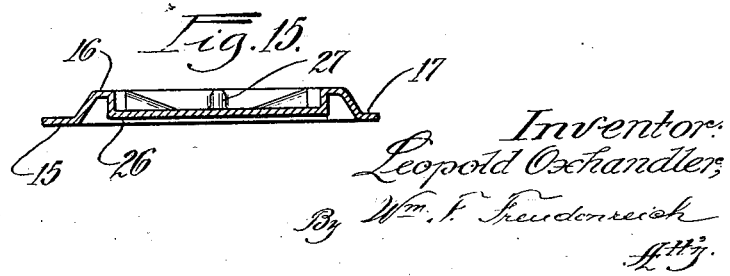
Inventor:
Leopold Oxhandler,
By Wm. F. Freudenreich
Atty.

Patented Apr. 28, 1931

1,803,128

UNITED STATES PATENT OFFICE

LEOPOLD OXHANDLER, OF CHICAGO, ILLINOIS

FLAT AND CUSHION FOR CELLULAR FILLERS

Application filed February 9, 1927. Serial No. 166,918.

The present invention relates to the packaging of fragile articles, particularly eggs, in such a way that they may be handled in the ordinary way and be shipped without danger of breakage. The principal object of the present invention is to produce a flat adapted to be employed with a cellular filler to lock the walls of the same against displacement, cushion an egg or other article lying in each cell, and provide recesses or depressions to hold liquid discharged from an egg in the event that an egg cracks, and localize such liquid in the area forming the bottom of the cell in which that particular egg is located.

There are at present in use flats provided with cup-shaped holders that lock each egg in a fixed position. If a crate of eggs packed between flats of this kind is given a heavy jar, the shells of the eggs must move with the crate, but the liquid contents of the egg shells are not restrained and therefore the inertia thereof tends to remain stationary while the shells are moving, causing a disturbance of the contents which eventually results in the settling of the yolks of the eggs to the bottom and consequent deterioration of the eggs. A further object of the present invention is to produce a simple and novel means of packaging eggs so that each egg will be housed in a secure compartment, be effectively cushioned, but be permitted to play about freely within the compartment so as to avoid the destructive influences arising from the locking of eggs in fixed relation to the crate.

In packaging eggs in crates it is necessary to place cushions in the bottom of the crates. A further object of the present invention is to produce a simple, novel and inexpensive cushion adapted to be placed in the bottom of an egg crate to protect the overlying eggs. A further object of the present invention is to produce a simple and novel flat that may be made at very little more expense that ordinary plain flats by simply embossing a sheet of paper after it has been formed and while it is still in a wet condition.

Figure 1:
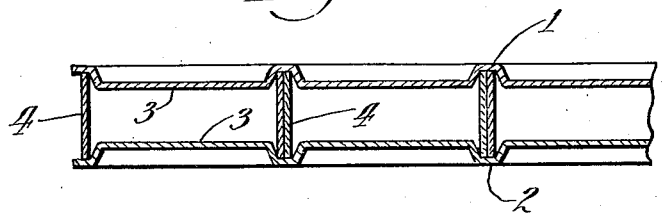
Figure 2:
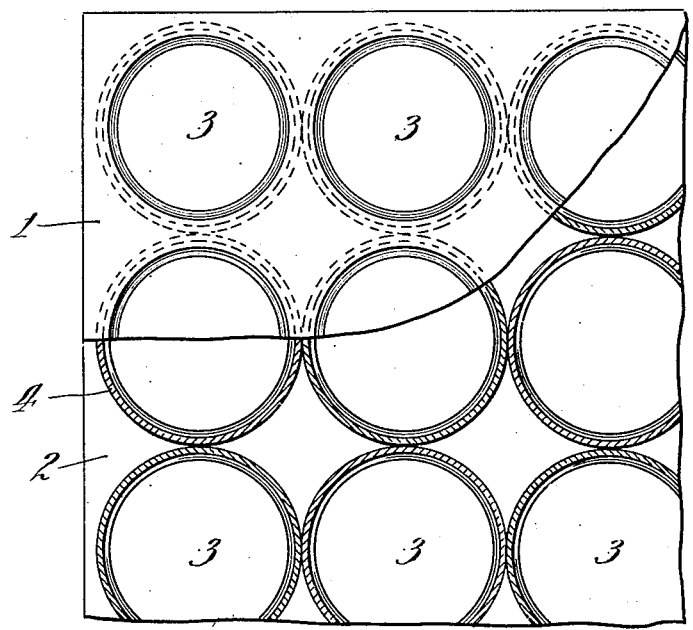
Figure 3:
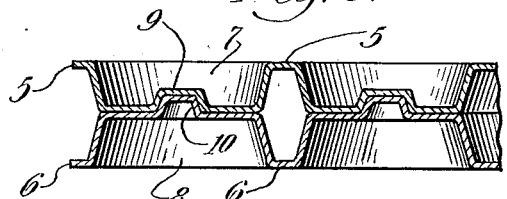
Figure 4:
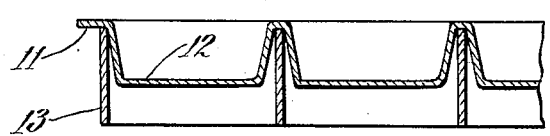

The various features of novelty whereby my invention is characterized will hereinafter be pointed out with particularity in the claim; but, for a full understanding of my invention and of its objects and advantages, reference may be had to the following detailed description taken in connection with the accompanying drawings, wherein:

Figure 1 is a vertical section through one of my improved cushions adapted to be placed in the bottom of a crate; Fig. 2 is a view of the cushion, partly in plan and partly in horizontal section; Figs. 3 and 4 are views similar to Fig. 1, showing two modified forms of cushions; Fig. 5 is a view of the cushion shown in Fig. 4, partly in plan and partly in section; Figs. 6 and 7 are respectively a plan view of a corner of and a vertical section through one of my improved flats; and Figs. 8 and 9, Figs. 10 and 11, Figs. 12 and 13, and Figs. 14 and 15 are views similar to Figs. 6 and 7, respectively, showing modified forms of flats.

Referring to Figs. 1 and 2 of the drawings, 1 and 2 represent sheets of paper pulp or other suitable material embossed or shaped in the process of manufacture of the sheets to provide them with numerous shallow pan-shaped depressions 3. The two sheets, which are exactly alike, are positioned one above the other with the depressions facing outwardly. Between the two sheets are placed short tubes 4 having an internal diameter about equal to the external diameter of the projections on the inner sides of the top and bottom sheets. These projections fit into the ends of the tubes, forming heads therefor. The sheets and the tubes may be fastened together in any suitable way to form a comparatively rigid, thick hollow plate. Suitable adhesive material may be employed for the purpose.

These cushions are ordinarily made of about the same size as the flats used in packing eggs or other articles, so that in packing eggs in crates, one of these cushions is first laid in the bottom of the crate and the eggs are then packed in in the usual way.

If desired, the cushions may be made of two sheets only instead of two sheets and numerous short tubes. Thus there is shown in Fig. 3 a cushion made of two sheets 5 and 6, having deep pan shaped elements 7 and 8 therein. These sheets are laid upon each other, the pans in one being inverted and those in the other upright, and the bottoms of the pans bearing against each other. The sheets may or may not be fastened together. The pans in one sheet may have central bosses 9 projecting into the same, while the pans in the other sheet may have central sockets 10 to receive the bosses. When the sheets are laid upon each other they are interlocked against relative lateral movements.

In Figs. 4 and 5 I have shown a cushion made of a single sheet 11 provided with pan-shaped depressions or projections 12, depending on the side from which the sheet is viewed, together with a base 13 consisting of a slab, preferably moulded, made up of a number of short tubular elements placed side by side and joined together into a single structure. The parts are so proportioned that when the sheet is laid upon the slab, the pan-shaped elements on the former fit into the upper ends of the tubular elements of the latter.

The cushions heretofore described serve to protect the collective mass of eggs or other articles against damage in the event that the crate is dropped heavily. Since the eggs are packed in layers, one above the other, each layer must be cushioned with respect to the other layers, and each egg must be cushioned with respect to the other eggs in the same layer. In Figures 6–15 of the drawings, I have illustrated various forms of flats that can be manufactured in unlimited quantities and at small cost and which, for all practical purposes, will function perfectly in cushioning individual eggs and layers of eggs when employed with the usual or any suitable cellular fillers.

Referring to Figs. 6 and 7, 15 represents a fibrous sheet divided into sections or squares 16 by means of two sets of grooves 17 and 18 arranged at right angles to each other. The lower edges of the elements of a cellular filler are adapted to enter these grooves, thereby causing each wall of each cell of a filler resting on the sheet or flat to be interlocked with the latter. The flat is made by molding pulp or by embossing a sheet, lending itself admirably to the embossing process because of the compositive flatness of the finished product as will be hereinafter explained.

Since flats must be made from comparatively light material, preferably soft material, the mere grooving of the sheet would not be sufficient to insure permanence of shape during handling and while in use in a crate. Furthermore, leakage of the liquid contents of an egg on the flat square or section below the egg would not be localized in that square. Again, eggs are packed by dropping them into the cells of the fillers and, where the old plain flats are used, many eggs will be cracked in packing unless care is exercised in lowering the eggs into the fillers. Therefore, in accordance with my invention, I have so modified each square or section that the flat will always retain its initial shape, leakage will be localized, and each egg will have above and below it a cushion separating it from the eggs directly above and below.

In the particular flat under discussion, the desired end is reached by corrugating the central portion of each square or section, as indicated at 19 and surrounding the corrugated area by a shallow continuous ledge or rib 20. The corrugations and ribs so stiffen the raised squares that the side walls of the grooves 17 and 18 are firmly anchored and braced and cannot flatten out. When an egg is dropped into a cell it strikes upon the corrugations so that, even though the flat should be in contact with another egg, directly below the one being dropped, the blow would be cushioned and neither egg would be damaged. In the event that an egg should be cracked so as to leak, the liquid would be confined to the receptacle bounded by the continuous rib or ledge.

It will be seen, however, that while provision is made for effectively interlocking the fillers with the flats and for cushioning each from above and below, as well as localizing any leakage, yet each egg is left free to move about in its cell. Thus the eggs may move bodily from side to side in their cells, avoiding most of the destructive stresses that are set up within an egg when the shell is locked to the crate. That there can be no disadvantage associated with freedom of movement of the eggs to offset the avoidance of destructive internal stresses is evident from the fact that the only violent lateral movement that any egg in a crate would make would be similar to and in the same direction as that made by every other egg upon the jolting of the crate. If the walls of the cells are held stationary, the shifting eggs cannot strike each other through such walls, but these walls actually serve as cushions that prevent abrupt stopping of the eggs; this being particularly true if the cell walls are interlocked only with the flat underneath and not with the overlying flat.

In the arrangement shown in Figs. 8 and 9 there are diagonal ribs 21 pressed upwardly from the squares 16. This construction does not serve to localize leakage, but cushions the eggs, locks the filler, and reenforces the troughs or grooves.

The arrangement shown in Figs. 10 and 11 is a variation of that in Figs. 6 and 7. Instead of having a raised continuous rib or ledge above each plateau-like square, I corrugate the entire top and depress it slightly, as indicated at 22, so that the upper portions of the sides of the grooves 17 and 18 form the outer sides of a continuous rib 23 or ledge surrounding the corrugated area.

The arrangement shown in Figs. 12 and 13 is like that in Figs. 6 and 7 with the corrugations left out and a dished center substituted therefor. In the center of the square or plateau is a low turret-like part 24, the top of which is made slightly concave or dished, as indicated at 25. This form of flat functions just as does the other except that it does not so effectively form a cushion to prevent an egg from striking a blow against a tall egg directly below it.

In the arrangement shown in Figs. 14 and 15 the center of the square is depressed instead of being raised, as indicated at 26, and in this depressed part are a plurality of radial ribs 27 pressed up from the flat bottom of the recess.

While I have illustrated and described with particularity only a few preferred forms of my invention, I do not desire to be limited to the details thus illustrated and described; but intend to cover all forms and arrangements which come within the definitions of my invention constituting the appended claim.

I claim:

A flat comprising a sheet of approximately uniform thickness throughout, portions of the sheet being pressed upwardly to form elevated plateaus, the central portion of each plateau being pressed upwardly to form a secondary elevation, and the central portion of each secondary elevation being depressed to form a bottom surrounded by a continuous ledge whose cross-section is an inverted U, and each said bottom having corrugations whose ends terminate at said ledge to stiffen and reinforce the latter.

In testimony whereof, I sign this specification.

LEOPOLD OXHANDLER.